US005347811A

United States Patent [19]

Hasegawa et al.

[11] Patent Number: 5,347,811

[45] Date of Patent: Sep. 20, 1994

[54] LOAD-SENSING ACTIVE HYDRAULIC CONTROL DEVICE FOR MULTIPLE ACTUATORS

[75] Inventors: Yoshimi Hasegawa, Yachiyo; Kenichi Nishiumi, Kawasaki; Yoshitake Yonekubo, Tokyo; Hisato Naito, Sagamihara; Hideshi Koiwai, Toda, all of Japan

[73] Assignee: Kayaba Industry Co., Ltd., Tokyo, Japan

[21] Appl. No.: 997,516

[22] Filed: Dec. 28, 1992

[30] Foreign Application Priority Data

Dec. 25, 1991 [JP] Japan ................................ 3-357128

[51] Int. Cl.[5] ............................................ F16D 31/02

[52] U.S. Cl. ........................................ 60/426; 60/468; 91/446; 91/517; 91/461

[58] Field of Search ................. 60/459, 466, 468, 445, 60/452, 420, 426, 413, 421; 91/446, 511, 517, 518, 461

[56] References Cited

U.S. PATENT DOCUMENTS

| | | | |
|---|---|---|---|
| 4,142,368 | 3/1979 | Mantegani | 60/413 |
| 4,353,286 | 10/1982 | Wetter | 60/413 X |
| 4,508,013 | 4/1985 | Barbagli | 91/518 X |
| 4,938,023 | 7/1990 | Yoshino | 91/518 X |
| 4,986,072 | 1/1991 | Kubomoto | 60/421 |
| 5,067,389 | 11/1991 | Germain | 91/446 |
| 5,107,753 | 4/1992 | Ioku | 91/518 X |
| 5,174,190 | 12/1992 | Ikari | 91/461 |

*Primary Examiner*—Edward K. Look
*Assistant Examiner*—Hoang Nguyen
*Attorney, Agent, or Firm*—Thomas R. Morrison

[57] ABSTRACT

A device for controlling multiple hydraulic actuators to protect a system from an overpressure caused by increasing the load on an individual actuator. By controlling the supply of hydraulic fluid to a pair of cylinders each associated with a pilot valve so that each cylinder always has enough fluid pressure to operate, the device of the present invention prevents the shutdown of the device caused by too much fluid going to the actuator operating at the maximum pressure. Thus all actuators continue to operate even if one is overpressured.

2 Claims, 6 Drawing Sheets

LOAD-SENSING ACTIVE HYDRAULIC CONTROL DEVICE FOR MULTIPLE ACTUATORS

BACKGROUND OF THE INVENTION

The present invention relates to a device for controlling multiple hydraulic actuators, and, more particularly, to a device for controlling multiple hydraulic actuators to protect a system from an overpressure caused by increasing the load on an individual actuator.

The present invention can be applied, for example, to such a system as a power shovel that operates such multiple actuators as a spin motor, a boom cylinder, an arm cylinder, a bucket cylinder, and a driving motor.

In the prior art, described below with reference to FIG. 1, the drain pressure of a variable drain pump is controlled by the maximum load pressure of in any one of multiple actuators. The prior art has drawbacks as follows.

In the prior-art device of FIG. 1, when the variable orifice of one of a pair of selector valves sets a minimum value and the variable orifice of the other selector valve sets a maximum value, the cylinder attached to the other selector valve makes a full stroke, causing the load to increase. The increased load triggers an overload relief valves associated with that cylinder. Because the power (or $Q \times P$, where Q is quantity of fluid and P is pressure) remains constant, the amount of fluid drained by the variable drain pump has to decrease, as shown by the curve in FIG. 2. Therefore the supply of fluid decreases to that selector valve set at the minimum value. In the worst case, the fluid supply drops so low that the cylinder stops altogether, thereby stopping all the actuators.

OBJECTS AND SUMMARY OF THE INVENTION

An object of the present invention is to provide a device for controlling multiple actuators that overcomes the drawbacks of the prior-art device.

A further object of the present invention is to provide a device for controlling multiple actuators where the fluid drained from the variable drain pump is not lost, so that all actuators can continue to work even when their load pressure rises.

Briefly stated, the present invention provides a device for controlling multiple hydraulic actuators to protect a system from an overpressure caused by increasing the load on an individual actuator. By controlling the supply of hydraulic fluid to a pair of cylinders each associated with a pilot valve so that each cylinder always has enough fluid pressure to operate, the device of the present invention prevents the shutdown of the device caused by too much fluid going to the actuator operating at the maximum pressure. Thus all actuators continue to operate even if one is overpressured.

According to an embodiment of the invention, a load-sensing active hydraulic control device comprises: a tank for containing hydraulic fluid; a plurality of actuators; a pump connecting to the plurality of actuators and to the tank; the pump being effective for pumping the hydraulic fluid; each of the plurality of actuators having at least two selector valves respectively; the at least two selector valves being connected in parallel; each of the at least two selector valves having at least one pilot chamber; each of the at least two selector valves having at least one variable orifice; the at least one variable orifice being open an amount responsive to a pressure in the at least one pilot chamber; a pressure compensating valve being connected to the at least one variable orifice, whereby a pressure difference is maintained between a load pressure on a one of the plurality of actuators and a pressure on a lower portion of the at least one variable orifice; at least one overload relief valve connected to a lower portion of each of the at least two selector valves, whereby a maximum pressure is fixed for the plurality of actuators; and means for controlling the output of the pump according to a load pressure on a one of the plurality of actuators, whereby, when the load pressure rises to a pressure sufficient to actuate the at least one overload relief valve, the at least one pilot chamber is connected to the tank.

According to a feature of the invention, a control device for multiple hydraulic actuators comprises: a tank for containing hydraulic fluid; a plurality of actuators; a pump connecting to the plurality of actuators and to the tank; the pump being effective for pumping the hydraulic fluid; each of the plurality of actuators having at least at least one selector valve; each of the at least one selector valve having at least one variable orifice; each of the at least one selector valve being disposed to assume a one of a plurality of positions; means responsive to the at least one variable orifice for controlling a supply of the hydraulic fluid between a fluid supply course and at least one of the plurality of actuators according to the one of the plurality of positions of the at least one selector valve; a pressure compensating valve being connected to the at least one variable orifice, whereby a pressure difference is maintained between a load pressure on a one of the plurality of actuators and a pressure on a lower portion of the at least one variable orifice; means for controlling a drain pressure of the pump, whereby the drain pressure is greater than a load pressure; means for connecting an output portion of the at least one selector valve of a first actuator with a supply portion of the at least one selector valve of a second actuator through a T-connecting fluid course; and the T-connecting fluid course having a selector valve that opens in response to the one of the plurality of positions of the at least one selector valve of the second actuator.

According to another feature of the invention, a load-sensing active control device comprises: a tank for containing hydraulic fluid; a plurality of actuators; a pump connecting to the plurality of actuators and to the tank; the pump being effective for pumping the hydraulic fluid; each of the plurality of actuators having at least two selector valves respectively; the at least two selector valves being connected in parallel; each of the at least two selector valves having at least one variable orifice; each of the at least two selector valves being disposed to assume a one of a plurality of positions; the at least one variable orifice being open an amount responsive to the one of the plurality of positions; a pressure compensating valve being connected to the at least one variable orifice, whereby a pressure difference is maintained between a load pressure on a one of said plurality of actuators and a pressure on a lower portion of the at least one variable orifice; a load-detecting fluid course being connected with a shuttle valve to detect a load pressure on each of the plurality of actuators; means for transferring a maximum pressure determined by the shuttle valve to a regulator of the pump, whereby a power output of the pump is maintained constant; a shutoff valve mounted in the load-detecting fluid course; means for connecting the shutoff valve directly to the shuttle valve; and the means being effective for closing the shutoff valve when a pressure on the shuttle valve rises over a fixed pressure.

The above, and other objects, features, and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
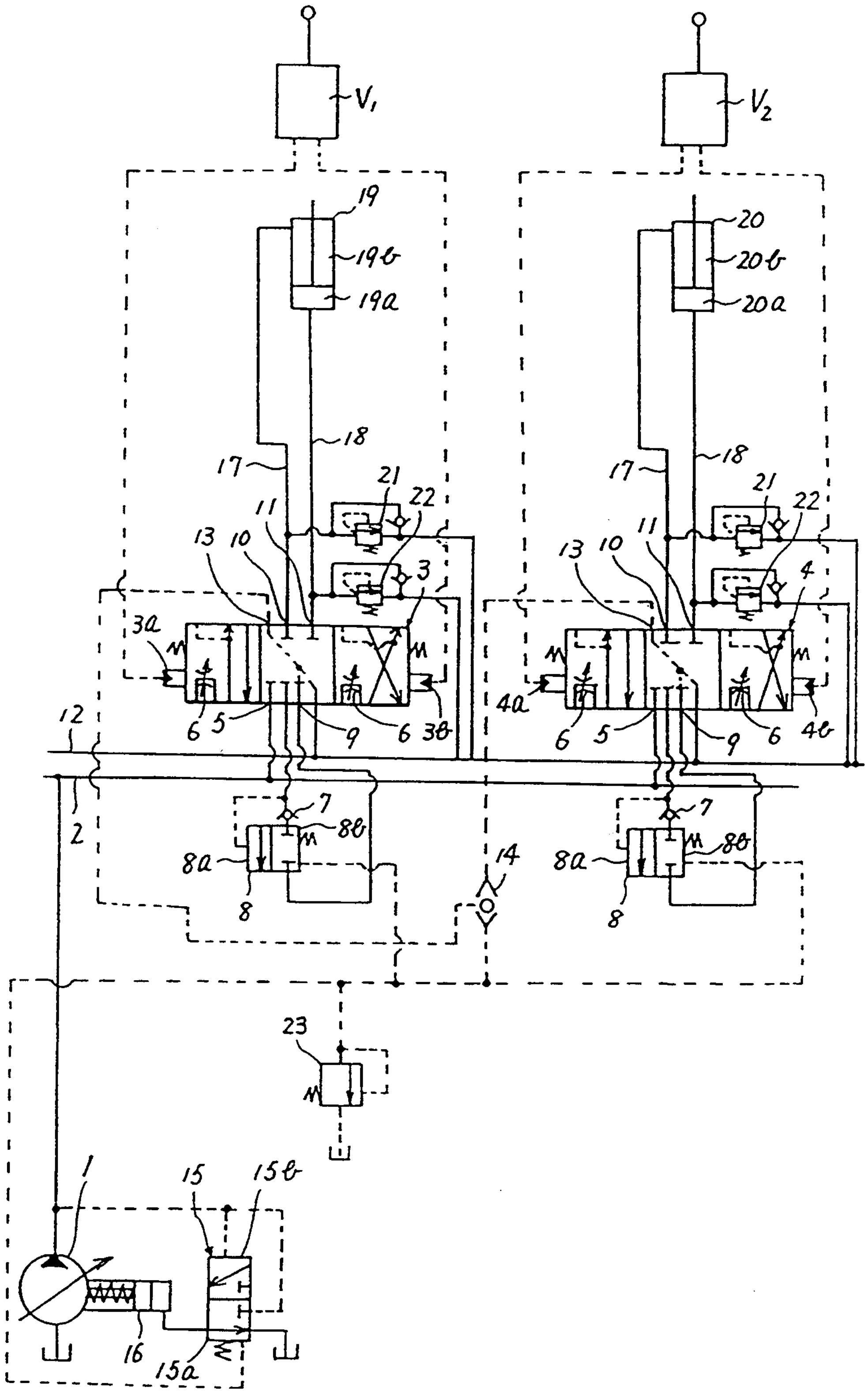
FIG. 1 PRIOR ART
FIG. 1 is a circuit diagram of the control device of the prior art.

Referring to FIG. 1, in the prior art, a variable drain pump 1 is connected to a pair of ports 5, 5, each associated respectively with a first selector valve 3 or a second selector valve 4 through a high pressure fluid course 2. Each of a pair of pilot chambers 3*a*, 3*b* and 4*a*, 4*b* are respectively attached at opposite sides of each of selector valves 3 and 4 and coupled to pilot operating valves V1 and V2, whereby pilot operating valves V1 and V2 control an output pilot pressure.

Selector valves 3 and 4 are normally in a neutral position and ports 5, 5 are closed selector valves 3 and 4 are each associated with a pair of variable orifices 6, 6'. Placing either of selector valves 3 or 4 in either a left or a right position opens the pair of variable orifices 6, 6' associated with that valve. The opening of the pair of variable orifices 6, 6' is proportional to the setting of the valve.

Below each pair of variable orifices 6, 6' is a pressure compensating valve 8 connected through a check valve 7. Each of selector valves 3 and 4 has a supply port 9 that connects to the lower side of pressure compensating valve 8. Supply ports 9, 9 are closed when selector valves 3 and 4 are at a neutral position. Moving selector valves 3, 4 to either a left or a right position couples supply ports 9, 9 with either of a pair of actuator ports 10, 11 and connects the other actuator port with a tank fluid course 12.

A pair of load detecting ports 13, 13 attached to selector valves 3 and 4 is connected with tank fluid course 12 when selector valves 3 and 4 are in a neutral position. When selector valves 3 and 4 are switched either left or right, each of load detecting ports 13 is connected to the actuator port 10, 11 with the higher pressure.

Pressure compensating valves 8, 8 equalize the respective pressures of the upper side of check valves 7, 7 to that of pilot chambers 8*a*, 8*a* and the respective pressures of load detecting ports 13, 13 to that of pilot chambers 8*b*, 8*b*. A shuttle valve 14 transfers to pilot chamber 8*b* the highest pressure of any one among the actuators controlled by selector valves 3 and 4.

Pressure compensating valve 8 operates at the pressure of the lower of the pair of variable orifices 6, 6', that is, at a fixed-rate higher than the maximum load pressure. The maximum load pressure chosen by shuttle valve 14 is transferred to a pilot chamber 15*a* of a control valve 15, and a pilot chamber 15*b* has the pressure of high pressure fluid course 2 or the pressure of variable drain pump 1. The difference between the pressure of variable drain pump 1 and the maximum load pressure actuates control valve 15. Control valve 15 operates control cylinder 16, which runs at constant power, to keep the pressure from variable drain pump 1 at a fixed rate higher than the maximum load pressure.

Each pair of actuator ports 10 and 11 of selector valves 3 and 4 is connected respectively to a pair of cylinders 19 and 20 through a pair of fluid courses 17 and 18 to which each of a pair of overload relief valves 21 and 22 are connected.

In the above arrangement, pilot operating valves V1 and V2 supply a pilot pressure to either pilot chambers 3*a*, 3*b* of selector valve 3 or pilot chambers 4*a*, 4*b* of selector valve 4. For example, the pilot pressure from pilot chamber 3*b* shifts selector valve 3 to the right position. Similarly, the pilot pressure from pilot chamber 4*b* shifts selector valve 4 to the right position.

As selector valves 3 and 4 change their settings, the opening of the pair of variable orifices 6, 6' also changes, and variable drain pump 1 supplies amounts of fluid under pressure that correspond to the ratio of each pair of variable orifices. The fluid is supplied to bottom chambers 19*a* and 20*a* of cylinders 19 and 20 or to individual actuators. The fluid in rod chambers 19*b*, 20*b* returns to tank fluid course 12 through selector valves 3 and 4. Control cylinder 16 controls the quantity of fluid from pump 1 according to the maximum load pressure on any one among the actuators.

Figure 2:
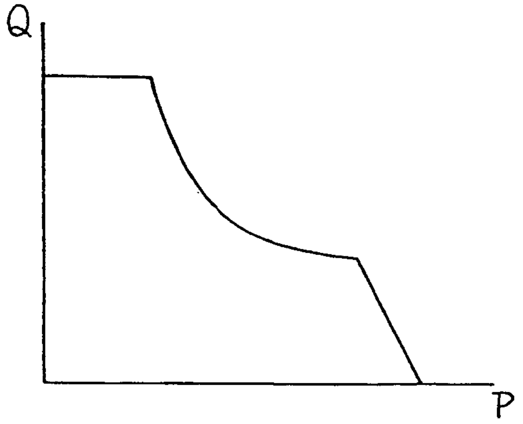
FIG. 2 is a graph showing the relationship of P (pressure) to Q (quantity of fluid) in a variable drain pump.

Referring to FIG. 2, variable drain pump 1 depends on the product of a pressure P and a quantity of fluid Q, which product is fixed. Thus the higher the maximum load pressure, the less the amount of fluid drained from variable drain pump 1. The amount drained corresponds to the ratio of the pair of variable orifices 6, 6' of either selector valve 3 or selector valve 4.

As the above description makes clear, since the drain pressure of variable drain pump 1 is controlled by the maximum load pressure on multiple actuators, a difficulty can arise in its operation.

When the pair of variable orifices 6, 6' of selector valve 3 is set to a minimum value and the pair of variable orifices 6, 6' of selector valve 4 is set to a maximum value, cylinder 20 makes a full stroke. The load increases so that either overload relief valve 21 or overload relief valve 22, each connected to cylinder 20, opens. The amount of fluid that drains from variable drain pump 1 decreases, according to the curve of FIG. 2, since the amount of power is fixed. Therefore the supply of fluid to selector valve 3 is reduced, and, in the worst case, cylinder 19 comes to a complete stop.

Figure 3:
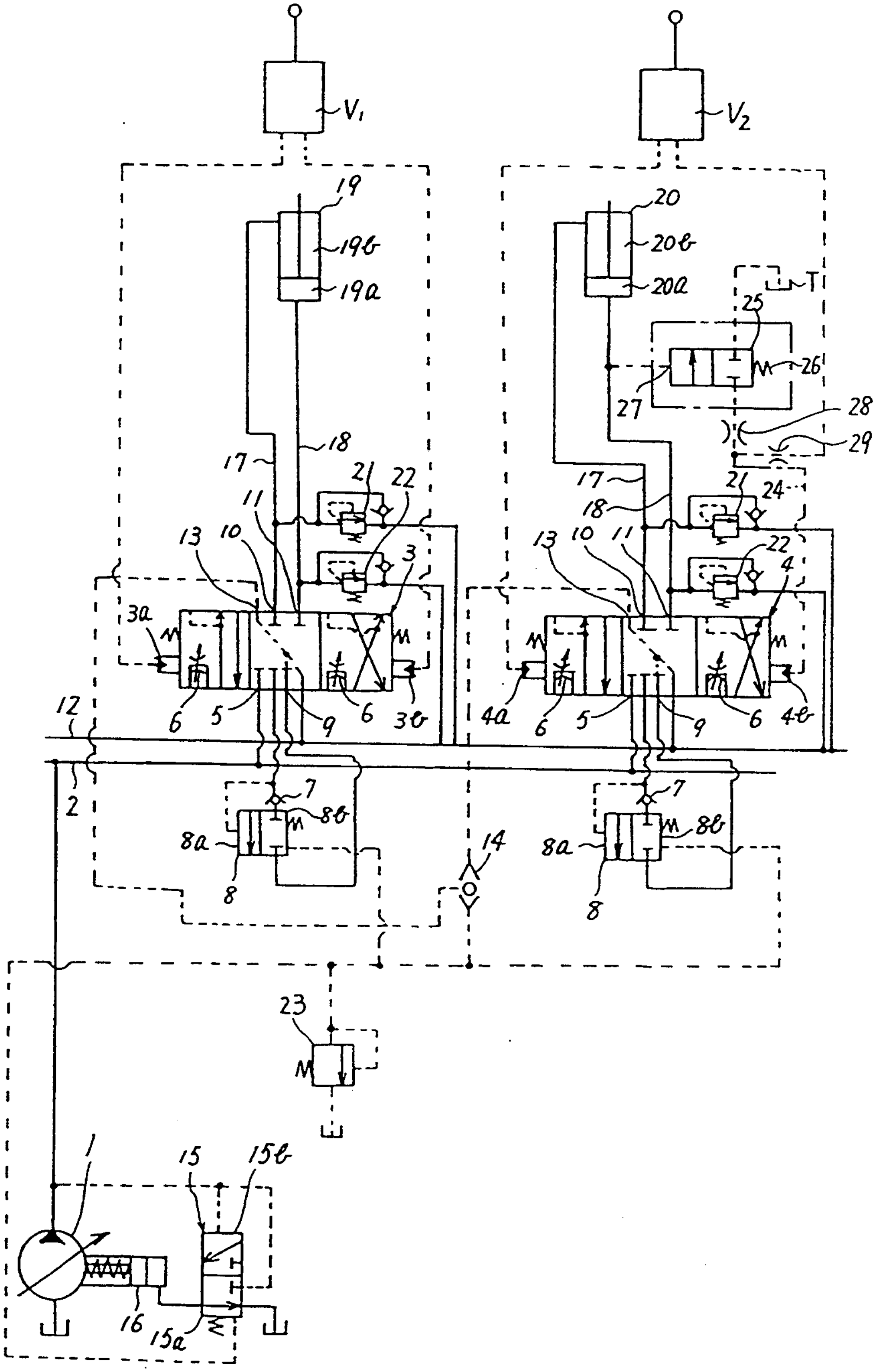
FIG. 3 is a circuit diagram of a first embodiment of the present invention.

Referring to FIG. 3, in a first embodiment of the present invention, a pilot chamber 4*b* of a selector valve 4 is connected to a pilot valve 25 through a pilot course 24 that extends into a tank T. Pilot valve 25 has a spring 26 at one side. A pilot chamber 27 is coupled to a fluid course 18 so that both have the same pressure. Pilot valve 25 is opened when the pressure of fluid course 18, or the load pressure of a cylinder 20, opens an overload relief valve 22.

The connection of pilot chamber 4b of selector valve 4 to tank T can be controlled by switching pilot valve 25. Normally, pilot course 24 is closed. Pilot course 24 contains an orifice 28. Pilot course 24 is also connected to a pilot operation valve V2 through an orifice 29.

A variable drain pump 1 is connected to a pair of ports 5, 5, each associated respectively with a selector valve 3 or with selector valve 4 through a high pressure fluid course 2. Each of a pair of pilot chambers 3a, 3b and 4a, 4b are respectively attached at opposite sides of each of selector valves 3 and 4 and coupled to pilot operating valves V1 and V2, whereby pilot operating valves V1 and V2 control an output pilot pressure.

Selector valves 3 and 4 are normally in a neutral position and ports 5, 5 are closed. Selector valves 3 and 4 are each associated with a pair of variable orifices 6, 6'. Placing either of selector valves 3 or 4 in either a left or a right position opens the pair of variable orifices 6, 6' associated with that valve. The opening of the pair of variable orifices 6, 6' is proportional to the setting of the valve.

Below each pair of variable orifices 6, 6' is a pressure compensating valve 8 connected through a check valve 7. Each of selector valves 3 and 4 has a supply port 9 that connects to the lower side of pressure compensating valve 8. Supply ports 9, 9 are closed when selector valves 3 and 4 are in a neutral position. Moving selector valves 3, 4 to either a left or a right position couples supply ports 9, 9 with either of a pair of actuator ports 10, 11 and connects the other actuator port with a tank fluid course 12.

A pair of load detecting ports 13, 13 attached to selector valves 3 and 4 is connected with tank fluid course 12 when selector valves 3 and 4 are in a neutral position. When selector valves 3 and 4 are switched either left or right, each of load detecting ports 13 is connected to the actuator port 10, 11 with the higher pressure.

Pressure compensating valves 8, 8 equalize the respective pressures of the upper side of check valves 7, 7 to that of pilot chambers 8a, 8a and the respective pressures of load detecting ports 13, 13 to that of pilot chambers 8b, 8b. A shuttle valve 14 transfers to pilot chamber 8b the highest pressure of any actuator controlled by selector valves 3 and 4.

Pressure compensating valve 8 operates at the pressure of the lower of the pair of variable orifices 6, 6', that is, at a fixed-rate higher than the maximum load pressure. The maximum load pressure chosen by shuttle valve 14 is transferred to a pilot chamber 15a of a control valve 15, and a pilot chamber 15b has the pressure of high pressure fluid course 2 or the pressure of variable drain pump 1. Accordingly, the difference between the pressure of variable drain pump 1 and the maximum load pressure actuates control valve 15. Control valve 15 operates control cylinder 16, which runs at constant power, to keep the pressure from variable drain pump 1 at a fixed rate higher than the maximum load pressure.

Each pair of actuator ports 10 and 11 of selector valves 3 and 4 is connected respectively to a pair of cylinders 19 and 20 through a pair of fluid courses 17 and 18 to which each of a pair of overload relief valves 21 and 22 are connected.

In the above arrangement, pilot operating valves V1 and V2 supply a pilot pressure to either pilot chambers 3a, 3b of selector valve 3 or pilot chambers 4a, 4b of selector valve 4. For example, the pilot pressure from pilot chamber 3b shifts selector valve 3 to the right position. Similarly, the pilot pressure from pilot chamber 4b shifts selector valve 4 to the right position.

As selector valves 3 and 4 change their settings, the opening of the pair of variable orifices 6, 6' also changes, and variable drain pump 1 supplies amounts of fluid under pressure that correspond to the ratio of the two pairs of variable orifices. The fluid is supplied to bottom chambers 19a and 20a of cylinders 19 and 20 or to individual actuators. The fluid in rod chambers 19b, 20b returns to tank fluid course 12 through selector valves 3 and 4. Control cylinder 16 controls the quantity of fluid from pump 1 according to the maximum load pressure on any one among the actuators.

If the pair of variable orifices 6, 6' of selector valve 3 is opened to the minimum setting, then the pair of variable orifices 6, 6' of selector valve 4 is opened to the maximum.

A full stroke of cylinder 20 raises the pressure and opens pilot valve 25. Pilot chamber 4b of selector valve 4 makes a connection with tank T. The pressure is decreased, and selector valve 4 returns to a neutral position, thereby reducing the opening of the pair of variable orifices 6, 6'. As a result, the amount of fluid flowing to cylinder 20 is decreased.

For example, when the level of the pair of variable orifices 6, 6' of selector valve 4 becomes less than the level of the pair of switching valve 3, the amount of fluid from variable drain pump 1 is decreased in proportion to the ratio of the two levels, so that fluid under pressure is supplied to fluid cylinder 19 connected to selector valve 3.

In this first embodiment, pilot valve 25 is connected only to bottom chamber 20a of cylinder 20. Pilot valve 25 may also connect to a single fluid course 17 or to both fluid courses 17 and 18.

Even though the load pressure of cylinder 20 increases almost to the pressure setting of overload relief valve 23, cylinder 19 will not stop.

Figure 4:
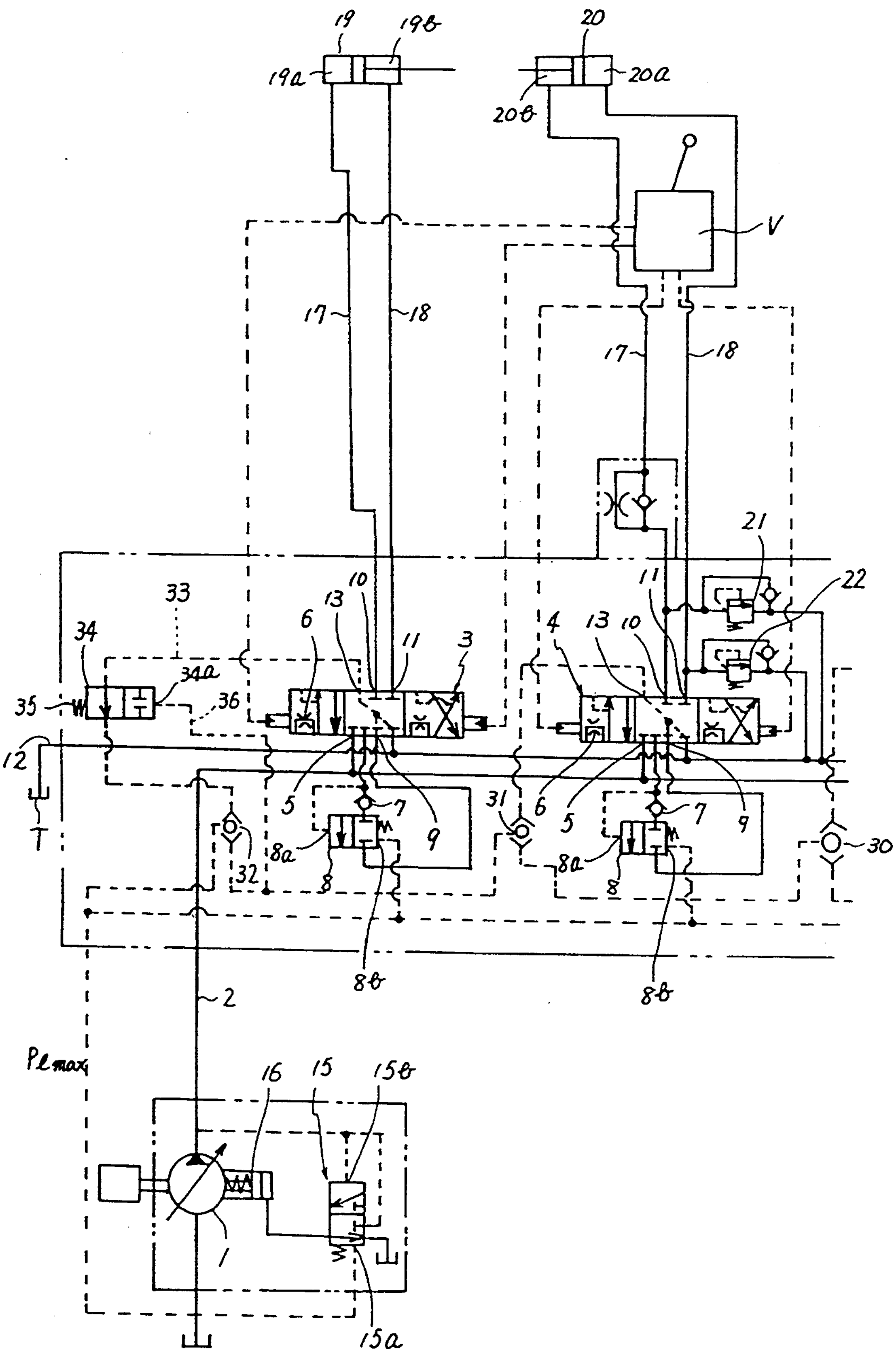
FIG. 4 is a circuit diagram of a second embodiment of the present invention.

Referring to FIG. 4, in a second embodiment there are switching valves additional to selector valves 3 and 4. The load pressure of all selector valves is led to pilot chamber 15a at one side of control valve 15 by three shuttle valves 30, 31, 32. A selector valve 34 is located between load detecting port 13 of selector valve 3 and shuttle valve 32. A spring 35 normally keeps switching valve 34 open; it closes when the pilot pressure to a pilot chamber 34a overcomes the restoring force of spring 35. Pilot chamber 34a is connected with the upper side of shuttle valve 32 through a fluid course 36.

Therefore, when the load pressure of the actuators (but not that of cylinder 19) rises above the fixed pressure on spring 35, switching valve 34 closes. The load pressure of cylinder 19 cannot then affect the amount of fluid that comes from variable drain pump 1.

Figure 5:
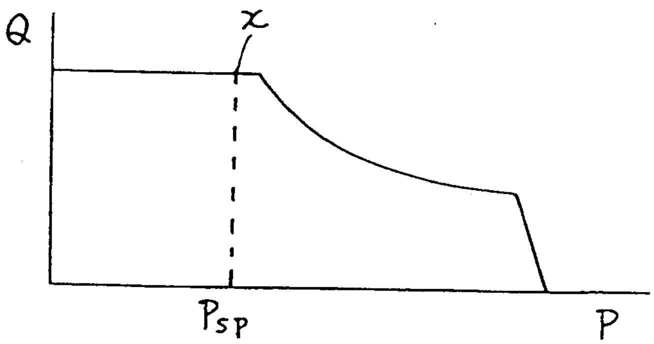
FIG. 5 is a graph showing the relationship of P to Q in the second embodiment of the present invention.

Referring to FIG. 5, when the fixed pressure of selector valve 34 is set to x Oust before the region of constant power represented by the area under the concave portion of the curve), and, in addition, cylinders 19 and 20 are operated simultaneously, even if the load pressure of cylinder 19 becomes very high, the amount of fluid that comes from variable drain pump 1 is not decreased.

In the second embodiment, when a pressure $P_F$ on the upper side of shuttle valve 32 is less than or equal to a fixed pressure $P_{SP}$ on switching valve 34, selector valve 34 remains open, so that, whatever the pressure in shuttle valve 32 (either $P_f$ from a fluid course 33, $P_F$, or a higher pressure $P_{lmax}$), that pressure is fed back to regulate control valve 15. The fluid pressure from variable drain pump 1 is controlled by the maximum value of the load pressures in all actuators. When $P_F$ is greater than $P_{SP}$, selector valve 34 doses so that $P_F$ is fed back to control valve 15 of the regulator. No matter what value the load pressure $P_f$ of cylinder 19 takes, the pressure fed back is fixed by $P_F$. When cylinder 19 reaches the end of its stroke and $P_f$ is greater than $P_F$, the former becomes at most $P_F$ plus a small constant $\alpha$.

Figure 6:
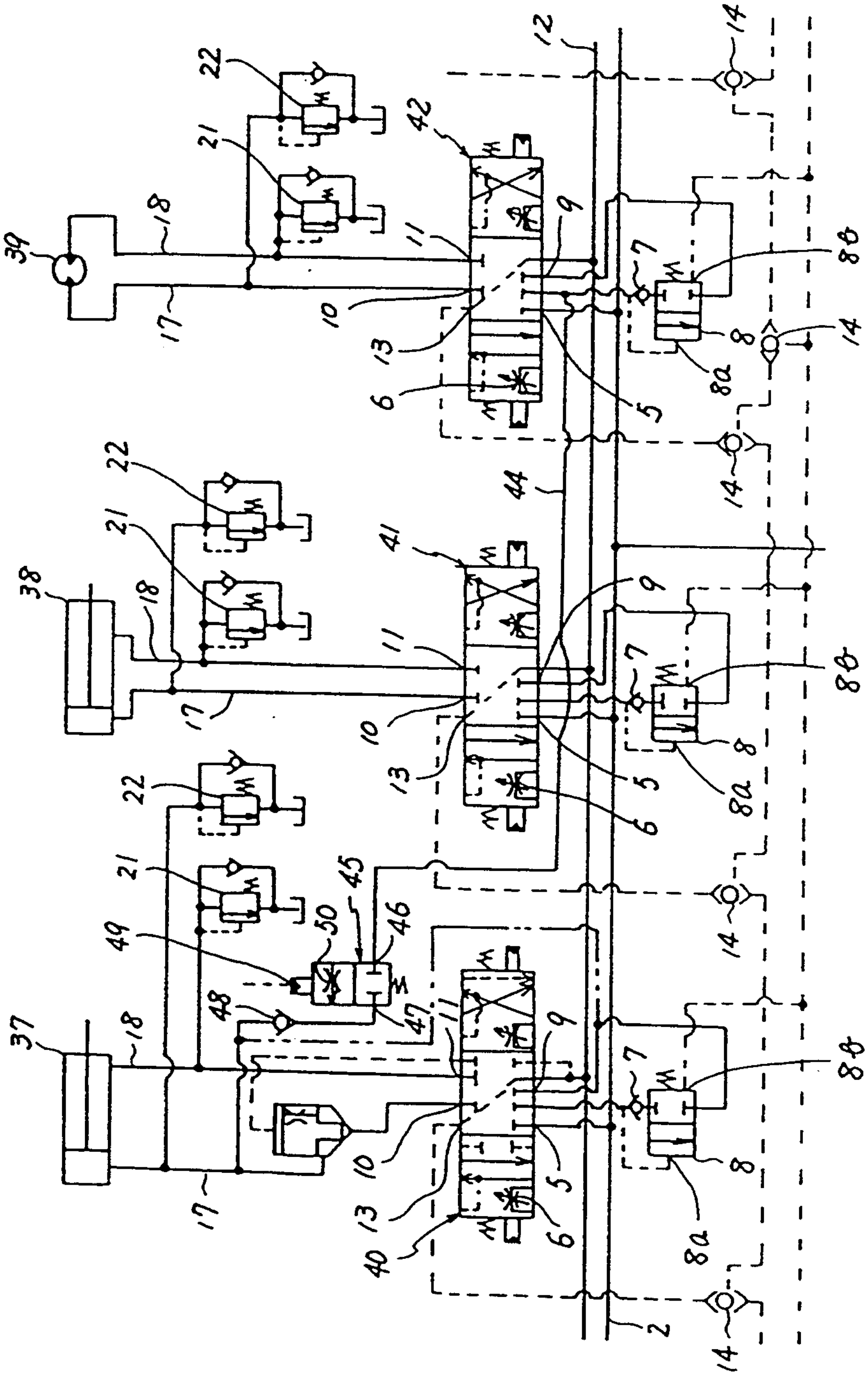
FIG. 6 is a circuit diagram of a third embodiment of the present invention.

Referring to FIG. 6, in a third embodiment, first, second, and third selector valves 40, 41, 42 are respectively connected to a boom cylinder 37, a bucket cylinder 38, and a spin motor 39. The structure, including each selector valve and each pressure compensating valve 8, is the same as in the first embodiment.

A T-connector joins one end of a fluid course 44 to the lower of a pair of variable orifices 6, 6' of third selector valve 42 and to pressure compensating valve 8. The other end of fluid course 44 connects to an inlet port 46 of a pilot operating valve 45. An outlet port 47 of pilot operating valve 45 connects to the bottom of boom cylinder 37 through a load checking valve 48.

When pilot operating valve 45 is in its normal position, it prevents inlet port 46 from coupling to outlet port 47. When a pilot chamber 49 reaches a pilot pressure, both inlet port 46 and outlet port 47 are connected through an orifice 50. Then the pilot pressure in pilot chamber 49 actuates first selector valve 40, thereby controlling boom cylinder 37 by pilot operating valve 45 as follows.

When first selector valve 40 is switched to the left side, as shown in FIG. 6, the pilot pressure from first selector valve 40 goes to pilot chamber 49 and causes pilot operating valve 45 to open. A portion of the fluid pressure supplied to the system of spin motor 39 is also supplied to the bottom of boom cylinder 37 through pilot operating valve 45.

Since a portion of the fluid supplied to the system of spin motor 39 is supplied to boom cylinder 37, if spin motor 39 is accelerated too fast, the load pressure of the system of spin motor 39 does not rise accordingly. Therefore, even if spin motor 39 is at a high pressure, the amount of fluid supplied to boom cylinder 37 is sufficient to keep it operating.

Figure 7:
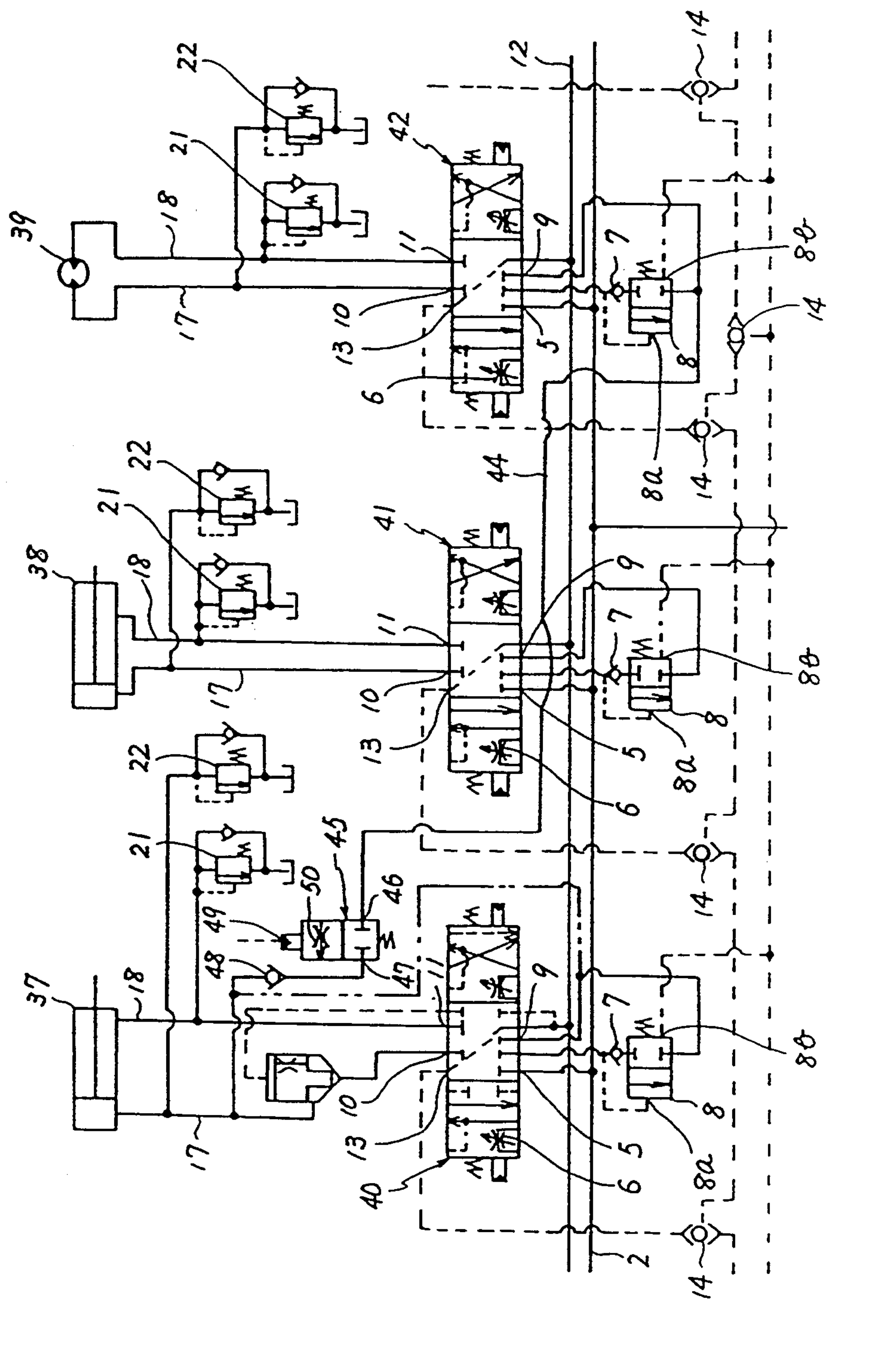
FIG. 7 is a circuit diagram of a fourth embodiment of the present invention.

Referring to FIG. 7, in a fourth embodiment, a T-connector joins a fluid course 44 to the lower side of a pressure compensating valve 8 and to a supply port 9 of a third selector valve 42. The other end of fluid course 44 connects to an inlet port 46 of a pilot operating valve 45. Otherwise the fourth embodiment has the same structure as the third.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A load-sensing active hydraulic control device, which comprises:

a plurality of actuators;

a source of pressurized fluid having a supply pressure, connected to said plurality of actuators, said pressurized fluid within said plurality of actuators having a plurality of individual load pressures;

a control valve having at least one pilot chamber, responsive to said plurality of individual load pressures, said control valve including means for controlling the supply of said pressurized fluid to said plurality of actuators;

a fluid course for communicating said plurality of individual load pressure to said at least one pilot chamber of said control valve;

at least one switching valve having a pilot chamber, responsive to said plurality of individual load pressures;

said at least one switching valve connected in series between said fluid course and at least one of said plurality of actuators;

said at least one switching valve including means for permitting communication between said fluid course and said at least one of said plurality of actuators when at least one of said plurality of individual load pressures within said at least one of said plurality of actuators is below a threshold value; and said at least one switching valve including means for prohibiting communication between said fluid course and said at least one of said plurality of actuators when at least one of said plurality of individual load pressures within said at least one of said plurality of actuators is above a threshold value.

2. A load-sensing active hydraulic control device, which comprises:

a plurality of actuators having inlets;

each of said plurality of actuators having at least and selector valve through which a pressurized fluid is fed to each of said inlets of said plurality of actuators;

said at least one selector valve receiving said pressurized fluid from at least one supply line;

said at least one selector valve including means responsive to a pilot pressure for controlling supply of said pressurized fluid to said inlets of said plurality of actuators;

a pilot operating valve and a load checking valve connected in series between one of said inlets of a first actuator of said plurality of actuators, and said at least one supply line of said at least one selector valve of a second actuator of said plurality of actuators;

said pilot operating valve including means responsive to said pilot pressure for opening said pilot operating valve when said pilot pressure is applied; and said load checking valve including means for allowing said pressurized fluid to flow only in the direction from said at least one supply line of said at least one selector valve of said second actuator of said plurality of actuators to said one of said inlets of said first actuator of said plurality of actuators.

* * * * *